March 31, 1964 G. E. GARDNER, JR 3,127,533
BRUSH LEAD CONNECTION FOR DYNAMOELECTRIC MACHINE
Filed Feb. 24, 1961

INVENTOR.
Grayson E. Gardner, Jr.
BY Paul J. Reising
His Attorney

United States Patent Office 3,127,533
Patented Mar. 31, 1964

3,127,533
BRUSH LEAD CONNECTION FOR DYNAMO-
ELECTRIC MACHINE
Grayson E. Gardner, Jr., Rochester, N.Y., assignor to General Motors Corporation, Detroit, Mich., a corporation of Delaware
Filed Feb. 24, 1961, Ser. No. 91,450
6 Claims. (Cl. 310—245)

This invention relates to dynamoelectric machines and more particularly to an improved brush assembly therefor. It has as its principal object the provision of a brush assembly which affords an excellent and durable electric connection between the brush and its associated electrical lead and yet which is easily assembled or disassembled thereby reducing manufacturing and maintenance costs.

Briefly, the invention comprehends an assembly comprising a channel or tubular shaped brush casing having its side walls formed with a pair of elongate or slot shaped openings extending generally from the rearward end toward the forward end of the casing, a brush slidably received in the forward end of the casing, an electrical lead wire secured to the brush having an outwardly extending elongate member which traverses and is retained within the brush casing at the rearward ends of the slot shaped openings, and a spring biased between the elongate member and the brush. In order to facilitate assembly operation and yet prevent unauthorized disassembly, at least one of the slot shaped openings in the casing is preferably formed with an enlarged portion toward its forward end and a portion of the elongate member is of enlarged section such that, during assembly, the member can be inserted through the enlarged portion of one opening and then moved rearwardly into the narrow ends of the openings with the enlarged section thereof within the casing. Hence, once assembled, the enlarged section precludes unauthorized disassembly of the member from the brush casing.

The above and other objects, features and advantages of the invention will appear more clearly from the following detailed description of a preferred embodiment thereof made with reference to the accompanying drawings in which.

Figure 1:
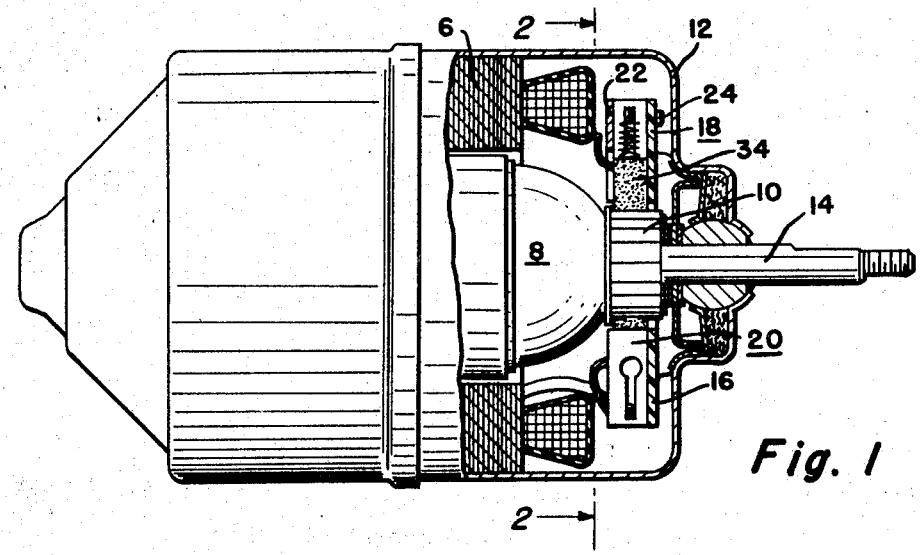
FIGURE 1 is a side view in partial section of an electric motor embodying the improved brush assembly of this invention.
Figure 2:
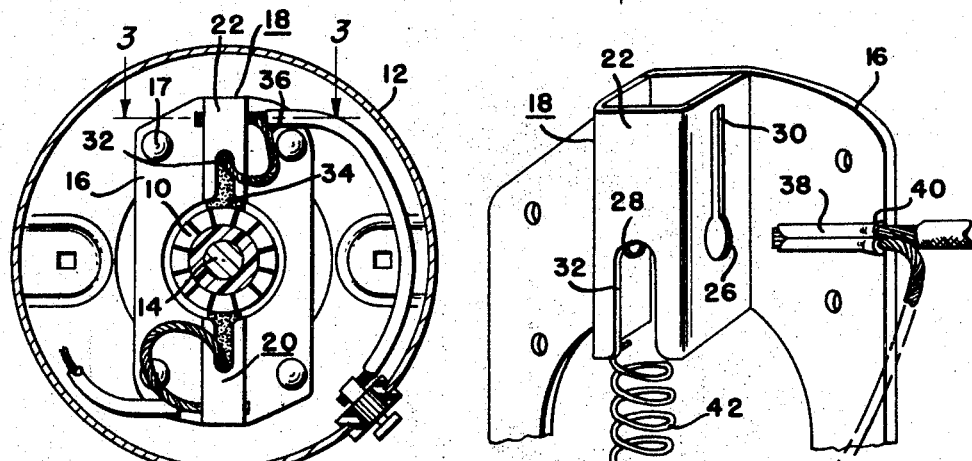
FIGURE 2 is a view taken on the line 2—2 of FIGURE 1 and shows the brush assembly in elevation.

Referring now to the drawings, there is shown in FIGURE 1 an electric motor having a field assembly 6, an armature 8 together with its associated commutator 10 mounted on a bearing supported shaft 14 for rotation within the field assembly, a metal casing 12 for the aforementioned components, and a pair of brush assemblies 18 and 20 associated with the commutator and mounted in the casing as hereinafter described. The structural details of the field assembly, the armature, the bearings and the casing form no part of the present invention, it being understood these components can take any form well known in the art.

The brush structure includes an insulator plate 16 which surrounds the commutator and which is secured to the motor casing in any suitable manner as for example by bolts 17, this plate supporting, in diametrically opposed relationship, the two brush assemblies 18 and 20. Since the two brush assemblies are of identical structure, the following description of that shown at 18 will suffice for both.

The assembly 18 comprises a channel shaped metal brush casing 22 of rectangular section which is secured to the insulator plate 16 by means of integral crimped tabs such as shown at 24 and which is formed with a pair of generally axially extending slot shaped, or keyhole openings 26 and 28, one in each of its opposed side walls. These slots or openings are aligned with each other and each has an enlarged portion of generally circular configuration at the lower end thereof and a narrow slit portion at the upper end thereof as shown at 30. In addition, the casing has an elongate opening 32 in the front wall thereof which communicates with the lower end of the casing.

Figure 3:
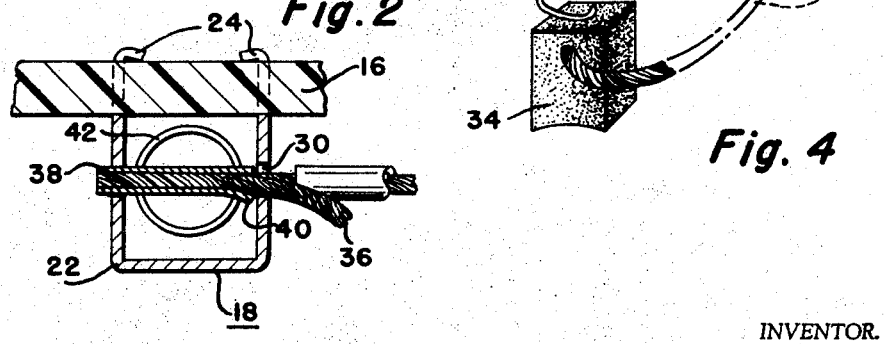
FIGURE 3 is a view taken on the line 3—3 of FIGURE 2.

A brush 34 of suitable conducting material fits slidably in the lower end of the brush casing and has secured thereto, as by soldering, crimping or packing, an electrical lead wire 36 which extends through the opening 32. At a point spaced from its connection to the brush, the lead wire 36 carries an outwardly extending member, this member being formed by a fold in the lead which has crimped thereover an elongate metal clip 38 having an enlarged section 40 at the inner end thereof. As can best be seen in FIGURE 3, this member extends through the narrow portions 30 of the openings 26 and 28 in the casing side walls and hence traverses the casing at the upper end thereof, the enlarged portion 40 being disposed within the casing and being of larger section than that of the slot 30 such that it cannot be withdrawn by a pulling force. A spiral spring 42 is biased between the clip 38 and the brush and urges the arcuate shaped front surface of the brush into contact with the commutator. It will be noted that the electrical connection between the lead 36 and the brush is not only assured by way of the connection between these two parts at the brush itself, but also by way of contact between the clip 38 and each of the spring 42 and the metal brush casing. The length of lead wire between the clip 38 and the brush provides some slack in the lead between these two parts and hence any pulling force on the lead to the other side of the clip bears only on the clip and not on the brush.

Figure 4:
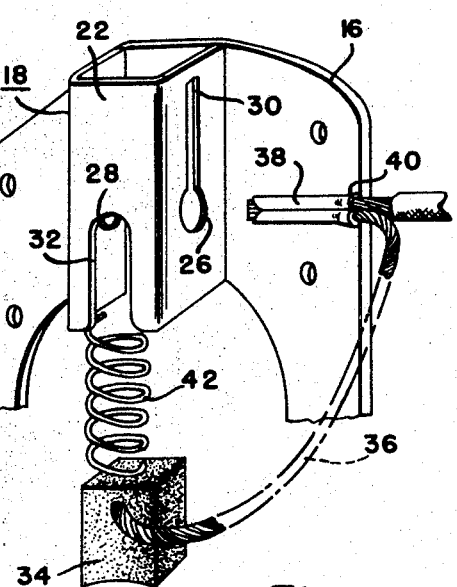
FIGURE 4 is an exploded perspective view of the brush assembly shown in FIGURES 1 and 3, but in larger scale, and illustrates the manner of assembling the various components.

The procedure for assembling the brush can best be seen by reference to FIGURE 4. First, the elongate clip 38 is inserted through the enlarged slot portion 26 until the enlarged end 40 of the clip is within the casing, at which point the free end of the clip will have projected through the slot in the opposed casing side wall, and the clip is then slid upwardly into the narrow portions 30 of the slots. The spring 42 and brush are then inserted into the lower end of the casing 22 and, upon securement within the motor with the brush 34 biased against the commutator, the assembly is complete. Since the spring 42 constantly biases clip 38 toward the upper end of the casing and therefore into the narrow portions of the slots, the clip, once assembled, cannot be withdrawn by pulling force. When disassembly is desired it is only necessary to remove the insulator plate 16 from its position with respect to the commutator and then withdraw the brush 34 at which time the clip can be dropped to the lower end of the slots and withdrawn through the enlarged portion 26.

It is not essential that both of the openings 26 and 28 be formed with enlarged portions at the lower ends thereof; an enlarged portion at the lower end of only one of the slots will suffice. However, for purposes of standardizing parts and allowing assembly of the clip into either side of the brush casing, it is desirable that both of the slots be formed with the enlarged lower portions.

It will be understood that while the invention has been described with particular reference to a preferred embodiment thereof, various changes and alterations may be made all within the full and intended scope of the claims which follow.

I claim:
1. A brush assembly for a dynamoelectric machine comprising a generally channel shaped brush casing having a pair of keyhole openings in the side walls thereof, said openings extending generally from the rearward end toward the forward end of said casing, a brush fitting slidably in said casing at the forward end thereof, an electrical lead connected to said brush, an elongate member connected to said lead at a point spaced from said brush, said member being transversely insertable only through the forward ends of said keyhole openings in said brush casing and slidable to the rearward ends of said openings, and a spring biased between said member and said brush for maintaining said member at the rearward ends of said openings.

2. A brush assembly for a dynamoelectric machine comprising a generally channel shaped brush casing having an opening communicating with the forward end thereof and a keyhole opening through each of a pair of opposed side walls thereof, said keyhole openings extending generally from the rearward end toward the forward end of said casing, a brush fitting slidably in said casing at the forward end thereof, an electrical lead connected to said brush and extending through said first mentioned opening, an elongate member connected to said lead at a point spaced from said brush, said elongate member being transversely insertable only through the forward ends of said keyhole openings in said brush casing and slidable to the rearward ends of said keyhole openings, and a spring biased between said member and said brush for maintaining said member at the rearward ends of said keyhole openings.

3. A brush assembly for a dynamoelectric machine comprising a generally channel shaped brush casing having a pair of slot shaped openings in the side walls thereof, said openings extending generally from the rearward end toward the forward end of said casing and at least one of said openings being enlarged at the forward end thereof, a brush fitting slidably in said casing at the forward end thereof, an electrical lead connected to said brush, an elongate member connected to said lead at a point spaced from said brush, said member extending transversely through said brush casing at the rearward ends of said openings, and a spring biased between said member and said brush, said member having an enlarged section whereby said member can be inserted through the enlarged portion of one of said openings and then moved rearwardly in said openings with the enlarged section thereof within said brush casing to preclude unauthorized disassembly thereof from the brush casing.

4. A brush assembly for a dynamoelectric machine comprising a generally channel shaped brush casing having aligned slot shaped openings extending through the side walls thereof generally parallel to the casing axis, at least one of said openings being enlarged at the forward end thereof, a brush fitting slidably in said casing at the forward end thereof, an electrical lead connected to said brush, an elongate clip connected to said lead at a point spaced from said brush, said clip extending transversely through said brush casing at the rearward ends of said openings, and a spring biased between said clip and said brush, said clip having a cross-section at least at the end thereof adjacent the lead which is less than that of the enlarged portion of the opening and greater than that of the rearward portions of the openings whereby said clip can be inserted through said enlarged portion and then moved rearwardly in said slots to preclude unauthorized disassembly thereof from the brush casing.

5. A brush assembly for a dynamoelectric machine comprising a generally channel shaped brush casing having an axially extending elongate opening communicating with the forward end thereof and a slot shaped opening through each of a pair of opposed side walls thereof, said slot shaped openings extending generally from the rearward end toward the forward end of said casing and at least one of said slot shaped openings being enlarged at the forward end thereof, a brush fitting slidably in said casing at the forward end thereof, an electrical lead connected to said brush and extending through said elongate opening, an elongate member connected to said lead at a point spaced from said brush, said elongate member extending transversely through said brush casing at the rearward ends of said slot shaped openings, and a spring biased between said member and said brush, said member having an enlarged portion adjacent its connection to said lead such that it can be inserted through the enlarged portion of one of said slot shaped openings and then moved rearwardly in said slot shaped openings with the enlarged portion thereof within said brush casing to thereby preclude unauthorized disassembly thereof from the casing.

6. A brush assembly for a dynamoelectric machine comprising a generally channel shaped brush casing having an elongate opening in a wall thereof communicating with the forward end of the casing and a slot shaped opening through each of a pair of opposed side walls thereof, said slot shaped openings extending generally from the rearward end toward the forward end of said casing and at least one of said slot shaped openings being enlarged toward the forward end thereof, a brush fitting slidably in said casing at the forward end thereof, an electrical lead wire connected to said brush and extending through said elongate opening, an elongate clip attached to said lead wire at a point spaced from said brush, said clip extending transversely through said brush casing at the rearward ends of said slot shaped openings, and a spring biased between said clip and said brush, said clip having an enlarged portion at the end thereof adjacent said lead wire such that it can be inserted through the enlarged portion of one of said slot shaped openings and then moved rearwardly in said slot shaped openings with the enlarged portion of said clip within said brush casing to thereby preclude unauthorized disassembly thereof from the casing.

References Cited in the file of this patent
UNITED STATES PATENTS

| | | |
|---|---|---|
| 1,401,679 | Dillin | Dec. 27, 1921 |
| 2,870,354 | Antonidis | Jan. 20, 1959 |
| 3,026,434 | Verhagen | Mar. 20, 1962 |

FOREIGN PATENTS

| | | |
|---|---|---|
| 1,238,113 | France | June 27, 1960 |